(12) United States Patent
Kamioka

(10) Patent No.: US 6,411,419 B1
(45) Date of Patent: Jun. 25, 2002

(54) BEAM SCANNING OPTICAL APPARATUS

(75) Inventor: Makoto Kamioka, Kasuga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 32 days.

(21) Appl. No.: 09/628,688

(22) Filed: Jul. 28, 2000

(30) Foreign Application Priority Data

Aug. 6, 1999 (JP) ........................................... 11-223397

(51) Int. Cl.[7] .............................................. G02B 26/08
(52) U.S. Cl. ....................... 359/201; 359/204; 359/216
(58) Field of Search ................................. 359/201, 204, 359/205, 206, 210, 216, 217, 218, 219; 347/241, 242, 243, 245

(56) References Cited

U.S. PATENT DOCUMENTS 5,450,119 A * 9/1995 Hinton et al. ................ 347/242
5,691,761 A * 11/1997 Fisli ............................ 347/241
6,313,906 B1 * 11/2001 Nagasaka et al. ........... 359/216

* cited by examiner

Primary Examiner—Cassandra Spyrou
Assistant Examiner—Euncha Cherry
(74) Attorney, Agent, or Firm—Stevens, Davis, Miller & Mosher, LLP

(57) ABSTRACT

A beam scanning optical system which is compact, and in which the advancing direction of beams from deflectors to scanning lenses in a first optical system is reverse to that in a second optical system, and the beams in the second optical system are led through between optical elements in the first optical system, for scanning surfaces to be scanned.

7 Claims, 7 Drawing Sheets

BEAM SCANNING OPTICAL APPARATUS

BACKGROUND OF THE INVENTION

The present invention relates to a beam scanning optical apparatus for creating an image through beam scanning.

RELATED ART

Heretofore, a beam scanning optical apparatus has been used as an image writing means in an electrophotographing process, and has been incorporated in a laser printer as an output unit of a computer or a facsimile machine, a laser facsimile and the like. Recently, there has been raised a demand for a high speed color laser printer, and accordingly, there has been highly interested in a tandem type beam scanning optical apparatus for this high speed color laser printer.

Next, a beam scanning optical apparatus incorporated in conventional tandem type color image forming apparatus will be explained with reference to FIGS. 6 and 7.

FIG. 6 is a view for explaining a cooler image forming apparatus incorporating a conventional beam scanning apparatus, and FIG. 7 is a plan view illustrating the beam scanning optical apparatus shown in FIG. 6.

As shown in FIG. 6, four imaging stations are located in the cooler image forming apparatus, respectively comprising photosensitive drums (photosensitive media) 10a, 10b, 10c, 10d serving as image bearing media, and further, there are provided around the respective photosensitive drums 10a, 10b, 10c, 10d, electrifiers 11a, 11b, 11c, 11d for uniformly electrifying the outer surfaces of the photosensitive drums 10a, 10b, 10c, 10d, development parts 12a, 12b, 12c, 12d for developing latent images, cleaning members 15a, 15b, 15c, 15d for removing residual toner, erasers 16a, 16b, 16c, 16d for initializing the surface potential of the photosensitive drums 10a, 10b, 10c, 10d, optical units 8a, 8b, 8c, 8d serving as beam scanning optical apparatuses for irradiating light beams which correspond to image data, onto the photosensitive drums 10a, 10b, 10c, 10d.

In this arrangement, the image stations create an yellow image, a magenta image, a cyan image and a black image, respectively, and the optical units 8a, 8b, 8c, 8d emit beams 9a, 9b, 9c, 9d as scanning beams, respectively corresponding to the black image, the yellow image, the magenta image and the cyan image. Further, these beams 9a, 9b, 9c, 9d form predetermined electrostatic latent images in surfaces 7a, 7b, 7c, 7d to be scanned on the photosensitive drums 10a, 10b, 10c, 10d, respectively.

As shown in FIG. 7, the optical units 8a, 8b, 8c, 8d respectively incorporate, beam emitters 1a, 1b, 1c, 1d, and deflectors 3a, 3b, 3c, 3d for deflecting beams emitted from the beam emitters 1a, 1b, 1c, 1d, scanning lenses 4a, 4b, 4c, 4d for focussing the deflected beams on the surfaces 7a, 7b, 7c, 7d to be scanned, mirrors 5a, 5b, 5c, 5d for leading the beams onto the surfaces 7a, 7b, 7c, 7d to be scanned, and synchronous detectors 6a, 6b, 6c, 6d for detecting synchronization among the beams.

An intermediate transfer belt (intermediate transfer medium) 13 in the form of an endless belt is laid below the photosensitive drums 10a, 10b, 10c, 10d, running through the respective imaging stations, and being supported by two rollers. The intermediate transfer belt 13 is turned around in a direction indicated by the arrow.

First transfer units 14a, 14b, 14c, 14d for transferring toner images created on the respective photosensitive drums 10a, 10b, 10c, 10d onto the intermediate transfer belt 13 are provided in the vicinity of the respective photosensitive drums 10a, 10b, 10c, 10d, the intermediate transfer medium being interposed therebetween.

It is noted that the toner images on the intermediate transfer belt 13 are transferred on to a sheet 17 fed from a stack of sheets stored in a paper feed cassette, by means of a second transfer unit 18, and then, the sheet is discharged onto a discharge tray (which is not shown) by way of a fixing unit 19.

In the cooler image forming apparatus having the above-mentioned structure, when a predetermined color image output signal is received, the rotation of the respective photosensitive drums 10a, 10b, 10c, 10d and the intermediate transfer belt 13 is started. Further, the respective photosensitive drums 10a, 10b, 10c, 10d are uniformly electrified by the electrifiers 11a, 11b, 11c 11d at predetermined potentials.

Meanwhile, in the respective optical units 8a, 8b, 8c, 8d, the deflectors 3a, 3b, 3c, 3d deflect the beams from the beam emitters 1a, 1b, 1c, 1d. The image zones on the photosensitive drums 10a, 10b, 10c, 10d are scanned with the thus deflected beams, respectively, by means of the mirrors 5a, 5b, 5c, 5d so as to carry out exposure. Before scanning the image zones of the photosensitive drums 10a, 10b, 10c, 10d, the beams are synchronized with one another by means of the synchronous detectors 6a, 6b, 6c, 6d, and then, the beams are irradiated, corresponding to image data, with a predetermined timing.

After the exposure by the beams, the electrified potentials on the outer surfaces of the photosensitive drums 10a, 10b, 10c, 10d are lowered so that electric latent images corresponding to the image data are created thereon. Thus, the optical units 8a, 8b, 8c, 8d create the latent images on the photosensitive drums 10a, 10b, 10c, 10d for the respective colors in response to the image data corresponding respectively to black, yellow, magenta and cyan.

The electric latent images created on the photosensitive drums 10a, 10b, 10c, 10d are developed with respective color toners by means of the developing parts 12a, 12b, 12c, 12d so as to be turned into color toner images. These toner images are transferred onto the intermediate transfer belt 13 by the first transfer units 14a, 14b, 14c, 14d so that the toner images having black, yellow, magenta and cyan are superposed with one another on the intermediate transfer belt 13.

After the superposition of the four cooler toner images is completed on the intermediate transfer belt 13, these four cooler images are transferred in a batch onto the sheet 17 fed from the paper feed cassette, by means of the second transfer unit 18, and are then heated for fixing so that a full cooler image can be obtained on the sheet 17.

It is noted that residual toner on the respective photosensitive drums 10a, 10b, 10c, 10d is removed by the cleaning members 15a, 15b, 15c, 15d after completion of the transfer of the images, and then, the respective photosensitive drums 10a, 10b, 10c, 10d are electrically initialized by the erasers 16a, 16b, 16c, 16d in preparation for the successive image formation. Thus, the printing operation is completed.

Thus, the images having back, yellow, magenta and cyan can be formed in parallel with one another, and accordingly, a beam scanning optical apparatus which can cope with high speed color printing can be obtained.

However, in the conventional beam scanning optical apparatus as mentioned above, since the four optical units are arranged, not only the body of the image forming apparatus becomes large-sized, but also the weight thereof becomes higher, resulting in inclusion of a high cost.

BRIEF SUMMARY OF THE INVENTION

Accordingly, an object of the present invention is to provide a compact beam scanning optical apparatus.

To the end, according to the present invention, there is provided a beam scanning optical apparatus comprising a first beam optical system composed of a plurality of optical blocks, in which beams emitted from beam emitters are deflected by deflectors and are then led to scanning lenses by means of mirrors so as to be focused on a surface to be scanned, and a second optical systems composed of a plurality of optical blocks, in which the beams emitted from the beam emitters are deflected by deflectors, and then led to scanning lens by means of mirrors so as to be focused on the surface to be scanned, and which is stacked with the first optical system one upon another, wherein the advancing directions of the beams in the first and second optical systems are reverse to each other from the deflectors to the scanning lenses, and the beam in the second optical system passes between optical elements in the first optical system in order to scan the surface to be scanned.

With this arrangement, the length of the beam scanning optical apparatus can greatly be reduced in comparison with an arrangement in which optical blocks are juxtaposed with one another, thereby it can have a compact size.

According to a first aspect of the present invention, there is provided a beam scanning optical apparatus including a first optical system composed of a plurality of optical blocks for deflecting beams emitted from beam emitters with the use of defectors, and thereafter, leading the beams to scanning lenses through the intermediary of mirrors so as to be focused onto a surface to be scanned, and a second optical system composed of a plurality of optical blocks for deflecting beams from beam emitters with the use of deflectors, and thereafter leading the beams to the scanning lenses so as to be focused onto a surface to be scanned, and stacked with the first optical system one upon another, the advancing directions of the beams in the first and second optical systems being reverse to each other from the deflectors and the scanning lenses, and the beams in the second optical system passing through between optical elements in the first optical system and then scanning a surface to be scanned. With this arrangement, there can be provided such a beam scanning optical system that its length can be greatly reduced, thereby it is possible to provide such an advantage that a beam scanning optical system can have a compact size in comparison with a conventional arrangement in which optical blocks are juxtaposed with one another According to a second aspect of the present invention, there is provided, in addition to the arrangement of the first aspect of the present invention, there is provided a beam scanning optical system in which the optical blocks are separated into a predetermined number of groups. With this arrangement, there can be offered such an advantage that the cost and the molding terms of a housing which constitutes each of the optical blocks, can be reduced.

According to a third aspect of the present invention, in addition to the arrangements of the first and second aspects of the present invention, there is provided a beam scanning optical apparatus in which the scanning lenses in the optical blocks constituting the first optical system have surfaces one side, serving as attachment surfaces, and the scanning lenses in the optical blocks constituting the second optical system, have surfaces on a side in opposite to the former side, serving as mounting surfaces. With this arrangement, the difference in scanning curvature can be relaxed, and accordingly, there can be offered such an advantage that color can be restrained from oozing when color toner images are superposed with one another, and misalignment of colors can be reduced.

According to a fourth aspect of the present invention, there is provided a beam scanning optical apparatus, in addition to the first to third aspects of the present invention, in which the beam emitters emit light beams laterally of the optical axes of the canning lenses, thereby it is possible to offer such an advantage that the workability and the reliability of electrical connection between the beam scanning optical system and an image forming apparatus.

BRIEF DESCRIPTION OF THE SEVERAL VIEWS OF THE DRAWING

Those and other features and advantages of the present invention will become apparent from the following detailed description of the preferred embodiments of the present invention with reference to the drawing in which.

DETAILED DESCRIPTION OF THE INVENTION

Figure 1:
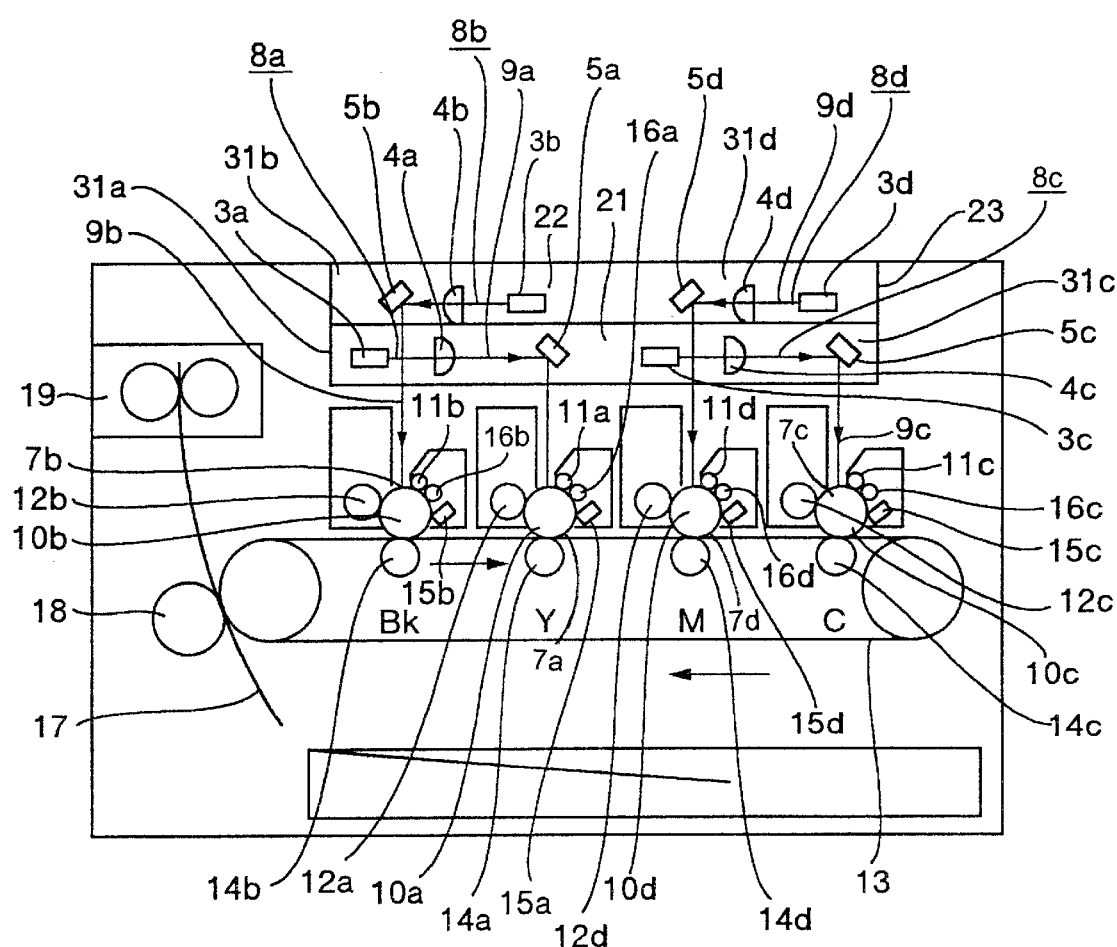
FIG. 1 is a view for explaining the arrangement of a image forming apparatus using a beam scanning optical apparatus in an embodiment of the present invention.
Figure 2:
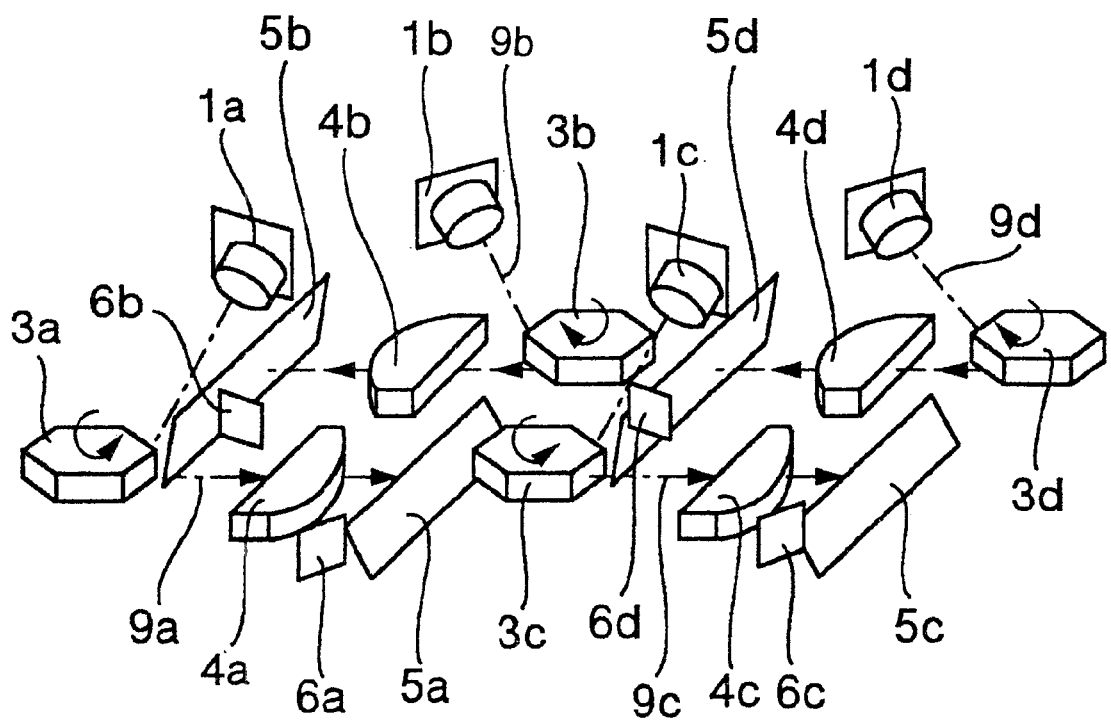
FIG. 2 is a plan view illustrating the beam scanning optical apparatus shown in FIG. 1.

Explanation will be hereinbelow made of embodiments of the present invention with reference to FIGS. 1 to 5, in which like reference numerals are used to denote like parts, and duplicated explanation thereto will be avoided.

As shown in FIG. 1, four image stations are located in the color image forming apparatus, respectively having photosensitive drums (photosensitive media) 10a, 10b, 10c, 10d as image bearing means. Around the respective photosensitive drums 10a, 10b, 10c, 10d, there are provided electrifiers 11a, 11b, 11c 11d for uniformly electrifying the outer surfaces of the photosensitive drums 10a, 10b, 10c, 10d, developing parts 12a, 12b, 12c, 12d for developing latent images, cleaning members 15a, 15b, 15c, 15d for removing residual toners, erasers 16a, 16b, 16c, 16d for initializing the surface potentials of the photosensitive drums 10a, 10b, 10c, 10d, and a beam scanning optical apparatus 23 for irradiating beams onto the photosensitive drums 10a, 10b, 10c, 10d, respectively, in accordance with image data.

In this arrangement, a yellow image, a magenta image, a cyan image and a black image are formed in the image stations, respectively, and beams 9a, 9b, 9c, 9d corresponding to the black image, the yellow image and the magenta image are delivered from optical units 8a, 8b, 8c, 8d.

Further, the beams 9a, 9b, 9c, 9d create predetermined electrostatic latent images on the photosensitive drums 10a, 10b, 10c, 10d within surfaces 7a, 7b, 7c, 7d to be scanned.

The beam scanning optical apparatus 23 is composed of a first optical system 21 and a second optical system 22 which are stacked one upon another. The first optical system 21 located at a lower stage is provided therein with an optical block 31a and an optical blocks 31c while the second optical system 22 is provided therein with an optical block 31b and an optical block 31d.

Figure 3:
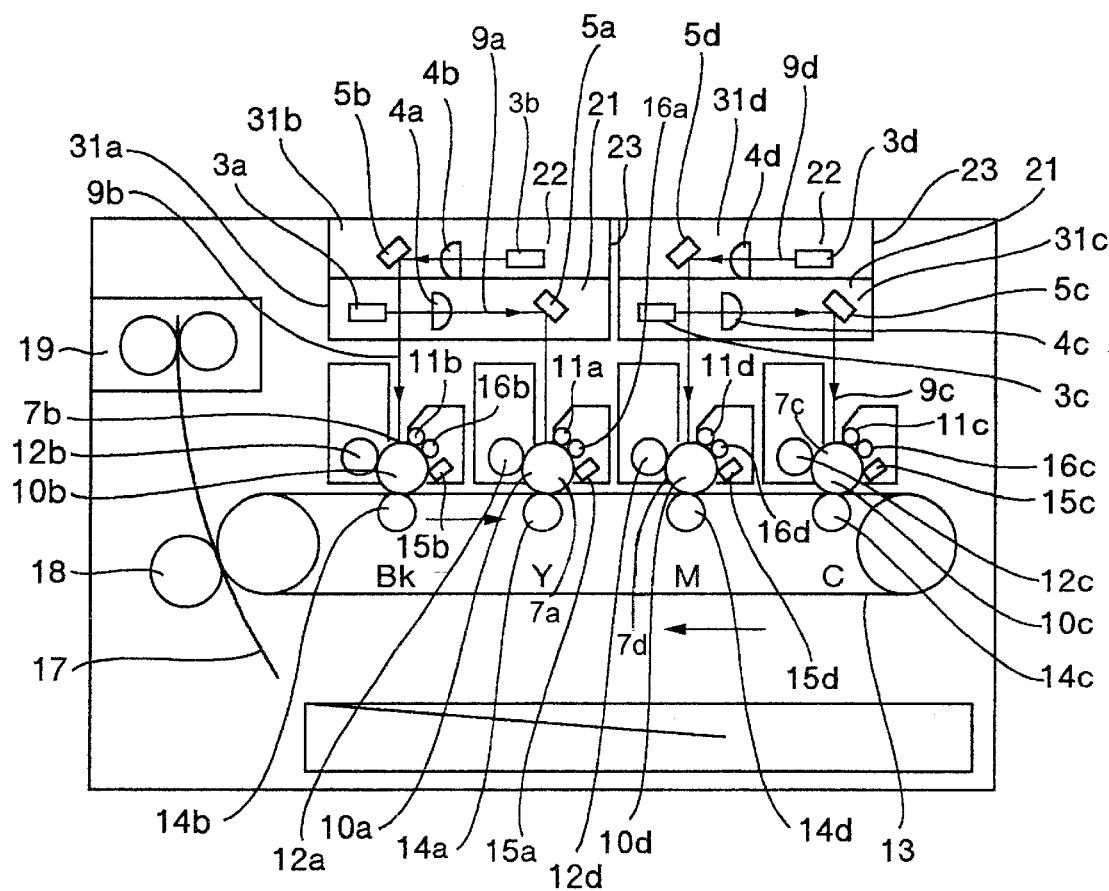
FIG. 3 is a view illustrating an arrangement of an image forming apparatus using a beam scanning optical apparatus in another embodiment of the present invention.

As shown in FIG. 3, the respective optical blocks 31a, 31b, 31c, 31d are composed of beam emitters 1a, 1b, 1c, 1d, deflectors 3a, 3b, 3c, 3d for deflecting beams emitted from the beam emitters 1a, 1b, 1c, 1d, scanning lenses 4a, 4b, 4c, 4d for focussing the deflected beams onto the surfaces 7a, 7b, 7c, 7d to be scanned, mirrors 5a, 5b, 5c, 5d for leading the beams onto the surfaces 7a, 7b, 7c, 7d to be scanned, and synchronous detectors 6a, 6b, 6c, 6d for detecting synchronization of the beams.

With this arrangement, the beams 9a, 9c led from the deflectors 31a, 31b to the scanning lenses 4a, 4c by way of the mirrors 5a, 5c in the optical blocks 31a, 31b of the first optical system 21 arranged at the lower stage travel from the left to the right as viewed in the figure. Then, the beams 9a, 9c reflected to the mirrors 5a, 5c are led respectively to the surfaces 7a, 7c to be scanned on the photosensitive drums 10a, 10c.

Meanwhile, contrary to the beams 9a, 9c, the beams 9b, 9d led from the deflectors 31b, 31d to the scanning lenses 4b, 4d by way of the mirrors 5b, 5d in the optical blocks 31b, 31d of the optical blocks 31b, 31d of the second optical system 22 arranged at the upper stage travel from the right to the left as viewed in the figure. Then, the beams 9b, 9d reflected by the mirrors 5b, 5d are led to the surfaces 7b, 7d to be scanned on the photosensitive drums 10b, 10d.

An intermediate transfer belt (transfer medium) 13 in the form of an endless belt supported by two rollers below the photosensitive drums 10a, 10b, 10c, 10d is laid so as to run through every image stations, and is rotated in the direction of the arrow.

First transfer units 14a, 14b, 14c, 14d for transferring toner images formed on the photosensitive drums 10a, 10b, 10c, 10d onto the intermediate transfer belt 13 are provided in the vicinity of the photosensitive drums 10a, 10b, 10c, 10d, the transfer belt 13 being laid therebetween.

It is noted that a sheet 17 stored in the paper feed cassette, onto which the toner images are transferred from the intermediate transfer belt 13 by means of a second transfer unit 18, is discharged into a paper discharge tray (which is not shown) by way of a fixing unit 19.

In the color image forming apparatus having the arrangement as mentioned above, when a predetermined color image output signal is received, the photosensitive drums 10a, 10b, 10c, 10d and the intermediate transfer belt 13 start their rotation. Further, the photosensitive drums 10a, 10b, 10c, 10d are uniformly electrified up to predetermined potentials by the electrifiers 11a, 11b, 11c, 11d.

Meanwhile, beams from the beam emitters 1a, 1b, 1c, 1d are deflected by the deflectors 3a, 3b, 3c, 3d in the respective optical blocks 31a, 31b, 31c, 31d. Thus, the deflected beams scan over the photosensitive drums 10a, 10b, 10c, 10d by means of the scanning lenses 4a, 4b, 4c, 4d and the mirrors 5a, 5b, 5c, 5d so as to carry out exposure. Before scanning the image zones on the photosensitive drums 10a, 10b, 10c, 10d, the beams are synchronized with one another by means of the synchronous detectors 6a, 6b, 6c, 6d, and then, the beams are irradiated with a predetermined timing, in accordance with image data.

After the exposure by the beams, the electrified potentials on the outer surfaces of the photosensitive drums 10a, 10b, 10c, 10d are lowered so as to create electric latent images in accordance with the image data. That is, the optical blocks 31a, 31b, 31c, 31d create electrostatic images on the different color photosensitive drums 10a, 10b, 10c, 10d in accordance with image data corresponding to colors of black, yellow, magenta and cyan, respectively.

The electric latent images formed on the different color photosensitive drums 10a, 10b, 10c, 10d are developed by the developing parts 12a, 12b, 12c, 12d with different color toners, respectively, and accordingly, are turned into color toner images. These toner images are transferred by the first transfer units 14a, 14b, 14c, 14d onto the intermediate transfer belt 13 so that the four black, yellow, magenta and cyan toner images are superposed one upon another on the intermediate transfer belt 13.

After completion of the superposition of the four color toner images on the intermediate transfer belt 13, these four color toner images are transferred onto the sheet 17 fed from the paper feed cassette by means of the second transfer unit 18 in a batch, and are then heated and fixed by the fixing unit 19.

It is noted that after completion of the transfer, the respective photosensitive drums 10a, 10b, 10c, 10d are cleaned by the cleaning members 15a, 15b, 15c, 15d so as to remove residual toner therefrom, and are electrically initialized by the erasers 16a, 16b, 16c, 16d in order to make preparation for successive image formation, that is, the printing operation is completed.

In the configuration of this embodiment, as mentioned above, the beam scanning optical apparatus 23 is composed of the first optical system 21 and the second optical system 22 which are stacked one upon another, and the optical block 31a and the optical block 31c are arranged in the first optical system 21 located at the lower stage, and the optical block 31b and the optical block 31d are arranged in the second optical system 22 located at the upper stage. That is, four optical blocks 31a, 31b, 31c, 31d are grouped into two sections each including two optical blocks, the two sections being stacked one upon other.

Accordingly, the length of the beam scanning optical apparatus 23 may have a short length which is about one-half of that of the arrangement in which four optical blocks are juxtaposed with one another.

With this arrangement, the length of the intermediate transfer belt 13 can be decreased so that the image forming apparatus can be small-sized. Thus, the number of components can be reduced, thereby it is possible to provide a lightweight inexpensive image forming apparatus.

It is noted that the four optical blocks 31a, 31b, 31c, 31d are accommodated in a single optical unit in the above-mentioned beam scanning optical apparatus 23 since the unevenness among scanning beams from the optical blocks 31a, 31b, 31c, 31d can be easily restrained in a tandem type color image forming apparatus.

However, should the four optical blocks 31a, 31b, 31c, 31d be incorporated in a-single optical unit, the housing of the optical unit would become large sized in a certain case, resulting in severe molding terms for the housing, or in increase in cost.

If the above-mentioned case would occur, the four optical blocks 31a, 31b, 31c, 31d are grouped in to two sections each having two optical units, or are all separated from one another in order to decrease the size of the housing.

In this case, if it is required to restrain unevenness among four beams from the optical blocks 31a, 31b, 31c, 31d with a high degree of accuracy, the separated optical blocks 31a, 31b, 31c, 31d are integrally incorporated with one another so as to obtain a signal optical unit.

With this arrangement in which the optical blocks 31a, 31b, 31c, 31d are separated from one another, the cost and the molding terms of the housing can be reduced and eased.

It is noted that there would be presented a problem relating to the scanning lenses 4a, 4b, 4c, 4d respectively provided for the four different colors, as a serious problem inherent to a tandem type color image forming apparatus. That is, the scanning lenses 4a, 4b, 4c, 4d have shapes slightly different from one another in precise meaning due to a lens forming or molding process or an assembly process of the optical system. These slight differences cause deterioration of reproducibility and color deviation in a color image in which four color images are superposed with one another, resulting in deterioration of the color image.

There may be enumerated difference in curve, difference in scanning speed, difference in scanning inclination, difference in magnification as differences in the optical characteristics of the optical blocks 31a, 31b, 31c, 31d. Inter alia, a curve causes a serious problem. This is because the scanning beams are curved through the optical blocks 31a, 31b, 31c, 31d by themselves so that no measures for correcting data or the like can be used in comparison with another optical difference.

Figure 4A:
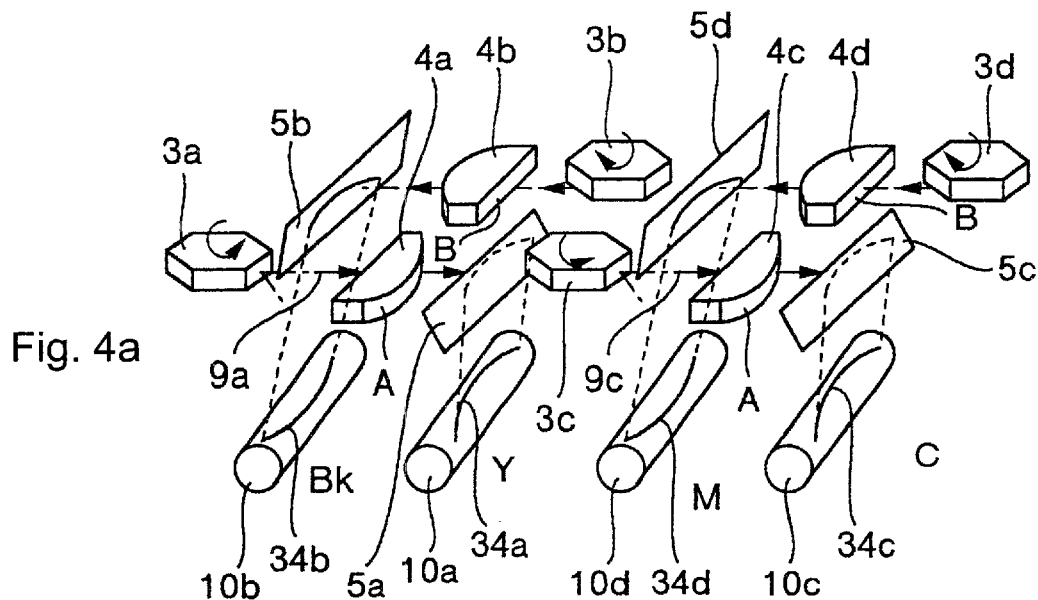
FIGS. 4a and 4b are views for explaining scanning characteristics of the beam scanning optical apparatus in the embodiment of the present invention.
Figure 4B:
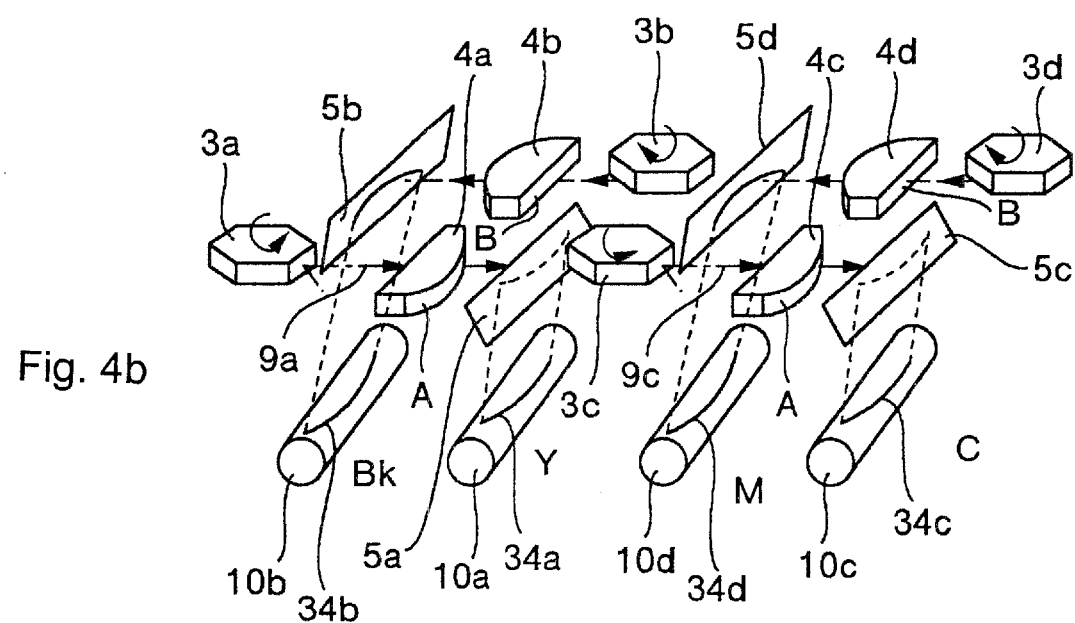

FIGS. 4(a) and (b) show curved latent images 34a, 34b, 34c, 34d created by scanning beams on the photosensitive drums 10a, 10b. 10c, 10d.

Referring to FIG. 4(a), the scanning lenses 4a, 4b, 4c, 4d located between the deflectors 3a, 3b, 3c, 3d and the mirrors 5a, 5b, 5c, 5d are all mounted in reference to the same mounting surface (incident surfaces B in this arrangement). With this arrangement, any of them has such a shape that it is upward curved in the center part of the surface of the mirror. This is caused by surface accuracy of the scanning lenses 4a, 4b, 4c, 4d, and similar curves are likely to occur being caused by a machining process or a molding process.

Further, in the case shown in FIG. 4(a), the curving direction of the optical blocks 31b, 31d located at the upper stage and the curving direction of the optical blocks 31a, 31c located at the lower stage are reverse to each other, and accordingly, there would be caused blotting of color or color deviation when different color toner images are superposed with one another so as to deteriorate the image.

On the contrary, if the surfaces at which the scanning lenses 4b, 4d between the deflectors 3b, 3d and the mirrors 5b, 5d at the upper stage are to be attached, are set to the incident surfaces B which are located on the side opposite to the emergent surface A of the scanning lenses 4a, 4c at the lower stage, the curves at the surfaces of the mirrors are exhibited in opposite curving directions between the optical blocks 31b, 31d located at the upper stage and the optical blocks 31a, 31c located at the lower stage. Accordingly, the curving directions of all latent images 34a, 34b, 34c, 34d at the scanning surfaces 7a, 7b, 7c, 7d on the photosensitive drums 10a, 10b, 10c, 10d are all identical with one another. With this arrangement in which the curving directions are identical with one another, blotting of colors and color deviation caused by the superposition of the color toner images can be restrained.

It is noted that the attaching surfaces of the scanning lenses 4b, 4d at the upper stage may be set to the emergent surface A while the attaching surfaces of the scanning lenses 4a, 4c at the lower stage may be set to the incident surface B.

Thus, the curving characteristics of the scanning lenses 4a, 4b, 4c, 4d caused by surface accuracy of the scanning lenses 4a, 4b, 4c, 4d are identical with one another, thereby it is possible to reduce the differences among four scanning curves on the photosensitive drums 10a, 10b, 10c, 10d.

Figure 5:
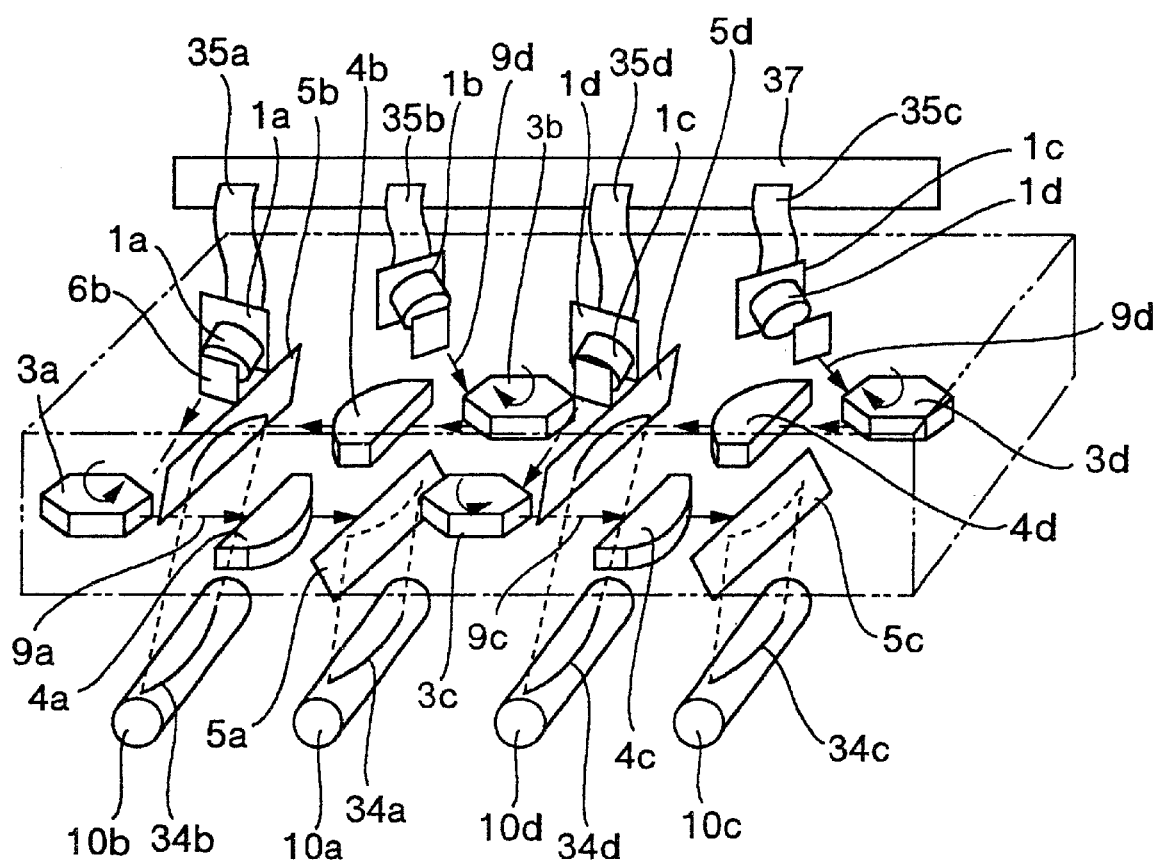
FIG. 5 is a view for explaining the arrangement of an image forming apparatus using a beam scanning optical apparatus in further another embodiment of present invention.
Figure 6:
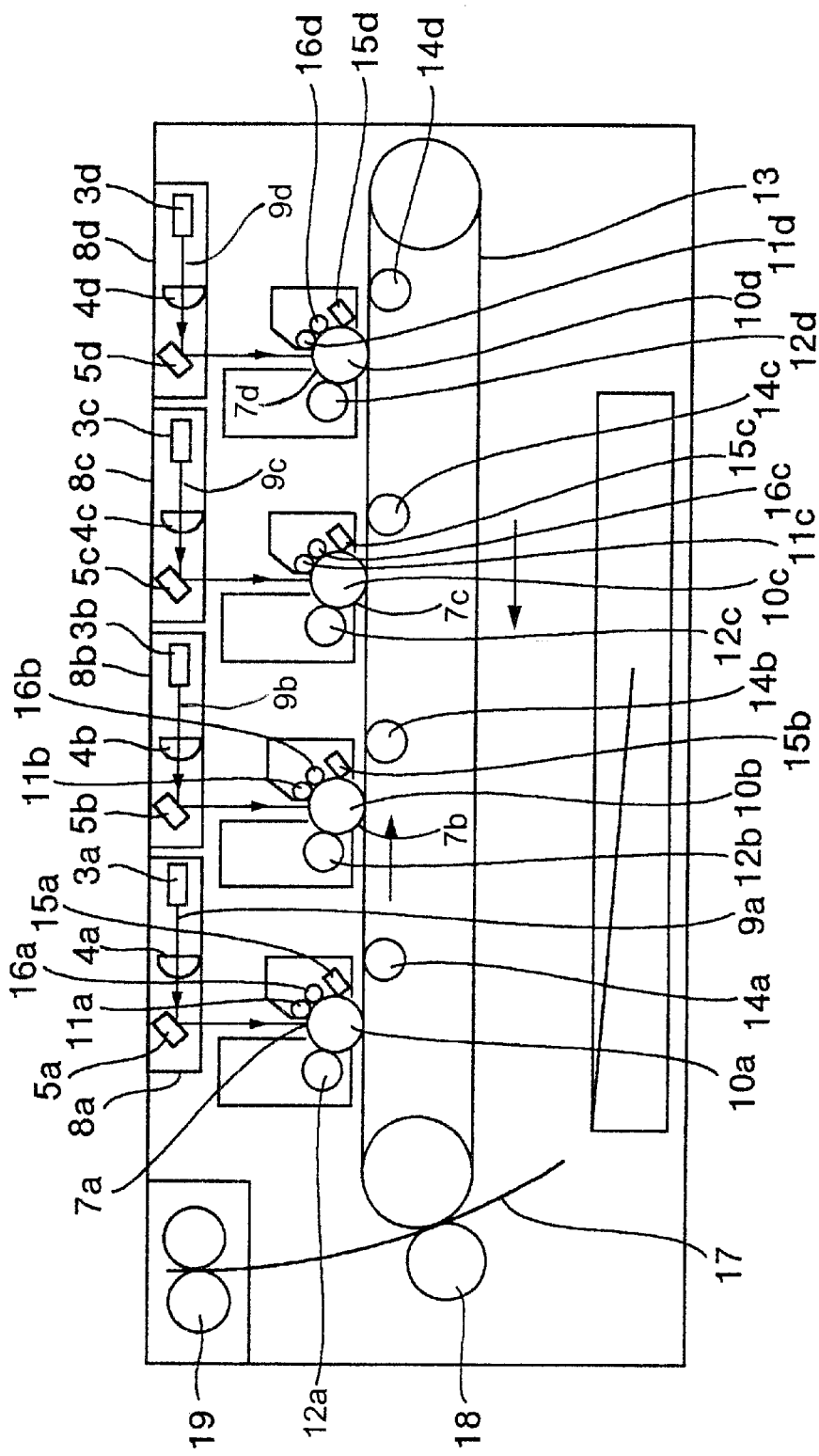
FIG. 6 is a view for illustrating a color image forming apparatus in which a conventional beam scanning optic apparatus is mounted.
Figure 7:
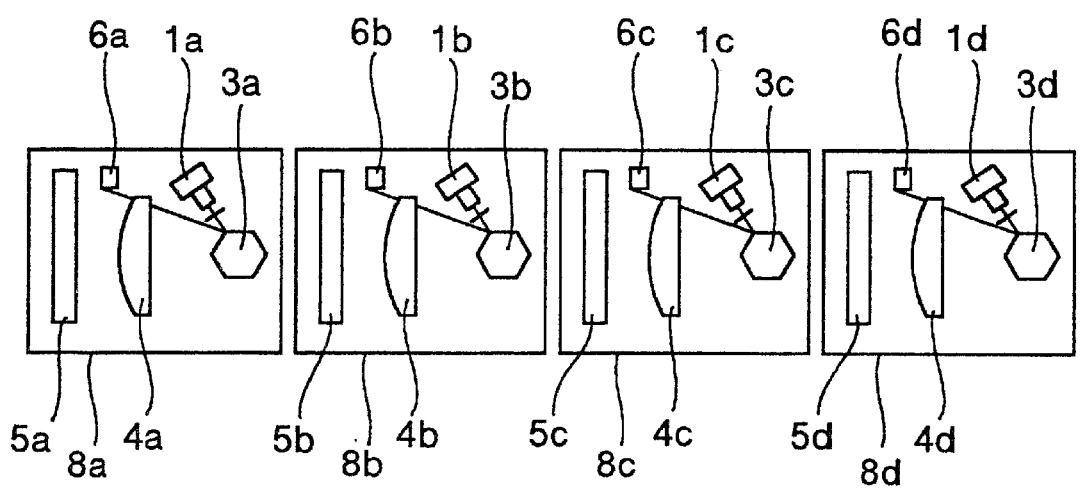
FIG. 7 is a plan view illustrating the beam scanning optical apparatus shown in FIG. 6.

Referring to FIG. 5 which shows such an arrangement that beams from the beam emitters 1a, 1b, 1c, 1d are irradiated on to the deflectors 3a, 3b, 3c, 3d, laterally of the optical axes of the scanning lenses 4a, 4b, 4c, 4d, if the beams emitters, 1d in the optical blocks 31a, 31b, 31c, 31d are arranged on one side of the optical axes, as shown, the electrical connection between the beam scanning optical apparatus and the body of the image forming apparatus can be facilitated.

It is noted in the arrangement shown in FIG. that the circuit board 37 located in the image forming apparatus is connected to the beam emitters 1a, 1b, 1c, 1d on the rear side, and accordingly, the lengths of harnesses 35a to 35d can be reduced, and thereby it is possible to aim at enhancing the workability and the reliability.

As mentioned above, according to the present invention, the length of the beam scanning apparatus can be greatly decreased in comparison with the conventional arrangement in which optical blocks are juxtaposed with one another, and accordingly, there can be offered such a remarkable advantage as to provide a compact beam scanning apparatus.

With this arrangement, the length of the intermediate transfer medium can be reduced so as to allow the forming device itself to be small-sized, and accordingly, the number of components can be reduced, thereby it is possible to offer such a remarkable advantage that a lightweight and inexpensive image forming apparatus can be obtained.

Further, by separating the optical blocks into a predetermined number of groups, there can be offered such a remarkable advantage that the cost and the molding terms of the housing constituting the optical blocks can be lowered and eased.

With such an arrangement that the attaching surfaces of the scanning lenses in the optical blocks constituting the first optical system are set on a side in opposite to the attaching surfaces of the scanning lenses in the optical blocks constituting the second optical system, the difference among the scanning curves can be reduced, and accordingly, there can be offered such a remarkable advantage that blotting of colors and color deviation caused by the superposition of color toner images can be restrained.

By laterally leading the beams emitted from the beam emitters to the optical axes of the scanning lenses, there can be offered such a remarkable advantage that the workability and the reliability in the electrical connection between the beam scanning optical apparatus and the image forming apparatus can be enhanced.

What is claimed is:

1. A beam scanning optical apparatus comprising:
   a first optical system comprising a plurality of optical blocks including beam emitters, deflectors and scanning lenses, wherein beams emitted from the beam emitters are deflected by the deflectors, and then led to the scanning lenses so as to be focused onto surfaces to be scanned,
   a second optical system comprising a plurality of optical blocks including beam emitters, deflectors and scanning lenses, wherein, in the second optical system, beams emitted from the beam emitters are deflected by the deflectors, and then led to the scanning lenses so as to be focused onto surfaces to be scanned, wherein an advancing direction of the beams from the deflectors to the scanning lenses in the first optical system is reverse to an advancing direction of the beams from the deflectors to the scanning lenses in the second optical system, and the beams in the second optical system are led through between optical elements in the first optical system, for scanning the surfaces to be scanned.

2. A beam scanning optical apparatus as set forth in claim 1, wherein the optical blocks in the first optical system and the second optical system are separated into a predetermined number of groups.

3. A beam scanning optical apparatus as set forth in claim 1, wherein the attaching surfaces of the scanning lenses in the optical blocks constituting the first optical system are set to a side opposite to the attaching surfaces of the scanning lenses of the optical blocks in the second optical system.

4. A beam scanning optical apparatus as set forth in claim 1, wherein the beam emitters in the first and second optical systems emit beams which are incident upon laterally of the optical axes of the scanning lenses in the first and second optical systems.

5. A beam scanning optical apparatus as set forth in claim 2, wherein the attaching surfaces of the scanning lenses in the optical blocks constituting the first optical system are set to a side opposite to the attaching surfaces of the scanning lenses of the optical blocks in the second optical system.

6. A beam scanning optical apparatus as set forth in claim 2, wherein the beam emitters in the first and second optical systems emit beams which are incident upon laterally of the optical axes of the scanning lenses in the first and second optical systems.

7. A beam scanning optical apparatus as set forth in claim 3, wherein the beam emitters the first and second optical systems emit beams which are incident upon laterally of the optical axes of the scanning lenses in the first and second optical systems.

* * * * *